United States Patent
Beiler et al.

(10) Patent No.: US 10,077,718 B2
(45) Date of Patent: Sep. 18, 2018

(54) VARIABLE POWER LIMIT CONTROL FOR GAS TURBINES

(71) Applicant: Siemens Aktiengesellschaft, Munich (DE)

(72) Inventors: Jan-Dirk Beiler, Mülheim a.d. Ruhr (DE); Hans-Georg Gamm, Dinslaken (DE); Thomas Kerstiens, Münster (DE); Marco Larson, Mülheim (DE); Rosa-Eos Mühlhölzer, Berlin (DE); Florian Purps, Mannheim (DE); Oliver Schneider, Wesel (DE); Marc Schäfer, Mülheim an der Ruhr (DE); Philipp Kreutzer, Dülmen (DE); Marc Reinberg, Krefeld (DE); Martin Stapper, Kamp-Lintfort (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/125,417

(22) PCT Filed: Mar. 3, 2015

(86) PCT No.: PCT/EP2015/054420
§ 371 (c)(1),
(2) Date: Sep. 12, 2016

(87) PCT Pub. No.: WO2015/139949
PCT Pub. Date: Sep. 24, 2015

(65) Prior Publication Data
US 2017/0107912 A1    Apr. 20, 2017

(30) Foreign Application Priority Data
Mar. 20, 2014    (EP) .................................. 14160875

(51) Int. Cl.
*F02C 9/28* (2006.01)
*F02C 9/16* (2006.01)

(52) U.S. Cl.
CPC .................. *F02C 9/16* (2013.01); *F02C 9/28* (2013.01); *F05D 2220/76* (2013.01); *F05D 2270/053* (2013.01); *F05D 2270/335* (2013.01)

(58) Field of Classification Search
CPC .... F02C 3/30; F02C 3/305; F02C 9/28; F02C 9/16; F02C 9/20; F02C 7/057;
(Continued)

(56) References Cited

U.S. PATENT DOCUMENTS

| 6,164,057 A | 12/2000 | Rowen et al. |
| 6,584,775 B1 | 7/2003 | Burkard et al. |

(Continued)

FOREIGN PATENT DOCUMENTS

| CN | 1771385 A | 5/2006 |
| CN | 101592085 A | 12/2009 |

(Continued)

OTHER PUBLICATIONS

EP Search Report dated Sep. 26, 2014, for EP application No. 14160875.2.

(Continued)

*Primary Examiner* — William H Rodriguez
*Assistant Examiner* — Jason H Duger
(74) *Attorney, Agent, or Firm* — Beusse Wolter Sanks & Maire

(57) ABSTRACT

A method for operating a gas turbine plant having a gas turbine and an electric generator driven by the gas turbine. The method includes detecting an instantaneous power of the gas turbine plant; comparing the detected instantaneous power with a power limit value; and limiting the instantaneous power when the result of the comparison is that the (Continued)

detected instantaneous power is equal to or greater than the power limit value. A step of detecting at least one operating parameter of the gas turbine plant and a step of determining the power limit value as a function of the at least one detected operating parameter are then implemented, wherein the at least one operating parameter of the gas turbine plant includes an ambient pressure and the power limit value is increased when the ambient pressure increases.

9 Claims, 2 Drawing Sheets

(58) Field of Classification Search
CPC .......... F02C 7/042; F02C 9/00; F02C 7/0422; F05D 2220/76; F05D 2270/312; F05D 2270/053; F05D 2270/335; F05D 2270/05; F05D 2270/095; F05D 2270/301; F05D 2270/313
See application file for complete search history.

(56) References Cited

U.S. PATENT DOCUMENTS

| | | | |
|---|---|---|---|
| 6,718,771 B1 | 4/2004 | Kopko | |
| 6,837,056 B2* | 1/2005 | Potnis | F02C 7/1435 60/39.5 |
| 6,871,160 B2* | 3/2005 | Jaw | G01M 15/00 700/108 |
| 7,069,727 B2* | 7/2006 | Hellat | F02C 7/26 60/39.27 |
| 7,104,071 B2* | 9/2006 | Braun | F02C 7/141 60/39.26 |
| 7,146,795 B2* | 12/2006 | Pelini | F01K 21/047 60/39.182 |
| 7,216,486 B2* | 5/2007 | Doebbeling | F02C 3/22 60/39.465 |
| 7,293,415 B2* | 11/2007 | Hoffmann | F02C 7/057 60/39.27 |
| 8,910,531 B1* | 12/2014 | Sue | G01M 15/14 73/862.041 |
| 9,255,525 B2* | 2/2016 | Ewens | F02C 9/28 |
| 2004/0112037 A1* | 6/2004 | Yagi | F01D 15/10 60/39.3 |
| 2006/0010876 A1 | 1/2006 | Hoffmann et al. | |
| 2008/0243352 A1 | 10/2008 | Healy | |
| 2009/0288420 A1 | 11/2009 | Grewe et al. | |
| 2011/0210555 A1 | 9/2011 | Xia et al. | |
| 2013/0019607 A1 | 1/2013 | Botarelli | |
| 2013/0042624 A1 | 2/2013 | Botarelli | |
| 2013/0227954 A1 | 9/2013 | Marini et al. | |

FOREIGN PATENT DOCUMENTS

| | | |
|---|---|---|
| EP | 1085267 | 3/2001 |
| EP | 2738370 A2 | 6/2014 |
| RU | 2334889 C2 | 9/2008 |
| RU | 2012122725 A | 1/2014 |
| RU | 2012122726 A | 1/2014 |

OTHER PUBLICATIONS

IPRP (PCT/IPEA/416) dated Jun. 22, 2016, for PCT application No. PCT/EP2015/054420.
International Search Report dated Mar. 31, 2015, for PCT application No. PCT/EP2015/054420.
CN Office Action dated Apr. 19, 2017, for CN patent application No. 201580014933.9.
Office Action dated Nov. 3, 2017, for RU patent application No. 2016141230.

* cited by examiner

VARIABLE POWER LIMIT CONTROL FOR GAS TURBINES

CROSS REFERENCE TO RELATED APPLICATIONS

This application is the U.S. National Stage of International Application No. PCT/EP2015/054420 filed Mar. 3, 2015, and claims the benefit thereof. The International Application claims the benefit of European Application No. EP14160875 filed Mar. 20, 2014. All of the applications are incorporated by reference herein in their entirety.

FIELD OF INVENTION

The invention relates to a method for operating a gas turbine plant and to a gas turbine plant operated in accordance with the method.

BACKGROUND OF INVENTION

The power limit of a gas turbine is the power at which a gas turbine can be operated at a maximum, and is determined by the mechanical integrity of the individual components of the gas turbine. The component which first reaches the limit of its mechanical load-bearing ability is decisive for the power limit of the gas turbine. Typically, these components are the downstream turbine blades in the main flow direction which, because of their radius and the greater centrifugal forces associated therewith and acting on the turbine blades, are most highly loaded.

In order to achieve the highest possible energy yield from the gas turbine, it is operated as close as possible to the power limit. The instantaneous power of the gas turbine is usually determined indirectly at the electrical outputs from an electric generator driven by the gas turbine in the gas turbine plant, by measuring the currents, voltages and possibly phase angles, since it is assumed that the instantaneous output power from the electric generator depends directly on the instantaneous power.

The instantaneous power of the gas turbine can briefly reach or exceed the power limit defined for the gas turbine on account of fluctuations in operating parameters. In this case, the gas turbine is throttled in order to ensure its mechanical integrity.

Furthermore, it is also known, for example from U.S. 2013/227954 A1 or U.S. Pat. No. 6,718,771 B 1, that the power limit value can be determined variably, depending on the ambient temperature, wherein the power limit value rises with falling temperatures. However, the problem with such a dependence is that the power limit adaptation for changing ambient conditions can be determined only in a restrictive manner.

SUMMARY OF INVENTION

The object of the invention is to provide an improved method for the operation of a gas turbine plant, in particular one which can also be adapted to further changing ambient conditions.

The invention therefore introduces a method for operating a gas turbine plant having a gas turbine and an electric generator driven by the gas turbine. The method has at least the following steps:—detecting an instantaneous power of the gas turbine plant;—comparing the detected instantaneous power with a power limit value; and—limiting the instantaneous power when the result of the comparison is that the detected instantaneous power is equal to or greater than the power limit value. According to the invention, a step of detecting at least one operating parameter of the gas turbine plant and a step of determining the power limit value as a function of the at least one detected operating parameter are provided.

According to the invention, the power limit value is to be increased when the ambient pressure increases and, respectively, the power limit value is to be reduced when the ambient pressure falls. The changes in the ambient pressure act in the same way as the ambient temperature on the mass flow of the compressor. Here, it is also possible to determine the mass flow of the compressor by using measurements and/or calculations, if appropriate as a function of the ambient temperature and the ambient pressure, as operating parameters of the gas turbine, and to select the power limit value as a function of this mass flow. For this purpose, if appropriate, further operating parameters such as the compressor outlet pressure or compressor outlet temperature can be taken into account.

The invention additionally has the advantage that a higher energy yield is achieved in that a variable power limit is used for the control of the gas turbine plant. The invention is based on and incorporates the understanding that the limitation through the electrical output power measured on the generator cannot be inferred directly from a critical instantaneous loading of the gas turbine, which is determined by the flow-based and mechanical rotation conditions in the gas turbine, for every operating state of the gas turbine plant. Thus, changes in the operating parameters of the gas turbine can permit a higher instantaneous power of the gas turbine which, under all other operating conditions, would represent an impermissibly high loading. A fixed power limit value which is applied equally to all the operating states of the gas turbine must be chosen so conservatively that it ensures the mechanical integrity of the gas turbine for all operating states. However, the use according to the invention of a variable power limit value, which is determined as a function of the operating parameters actually present at a given time, in specific situations permits the instantaneous power of the gas turbine plant to go beyond such a conservatively chosen power limit value, which means that the total energy yield and therefore the profitability of the gas turbine plant rises. In particular, adaptation of the power limit value to further varying ambient conditions is provided, so that more accurate and more flexible adaptation can be made.

The at least one operating parameter of the gas turbine plant advantageously further comprises at least one selected operating parameter from an ambient temperature, a total running time of the gas turbine and a total energy yield from the gas turbine plant. These operating parameters are those which directly influence the instantaneous power of the gas turbine (ambient temperature) and have an effect on the mechanical load limit of the gas turbine (total running time and total energy yield). These operating parameters can, if appropriate, be determined by sensors such as thermocouples or pressure sensors. Alternatively, these operating parameters can also be used instead of the ambient pressure operating parameter to determine a power limit value.

The power limit value is reduced if the total running time of the gas turbine exceeds a previously determined threshold value. This embodiment of the invention takes account of the fact that the loading relative to the measured power on the generator also rises with increasing aging. Accordingly, with otherwise identical gas turbines having different aggregate running times, higher power limit values can be selected for those with the lower running times than for the others. Here, the load-bearing ability of the components changes far less than the power yield with the same mechanical loading. The aging can be predefined either in the form of a fleet-specific characteristic or in the form of a calculation from operating parameters. This permits suitable power limit values also to be selected following a repair or modification to the gas turbine, in which individual components of the gas turbine were replaced or repaired.

The instantaneous power of the gas turbine plant can be determined by an electrical output from the electric generator of the gas turbine plant being determined. Alternatively, however, it is also possible to determine the instantaneous power of the gas turbine plant by an instantaneous turbine power of the gas turbine of the gas turbine plant being determined. The determination of the electrical output from the generator of the gas turbine plant can be carried out simply and, in many existing gas turbine plants, is possible without constructional change. The use of the instantaneous turbine power, on the other hand, has the advantage that the forces and loadings actually acting on the individual components of the gas turbine can be derived directly, so that suitable power limit values follow directly. The control can thus be based directly on a new controlled variable, namely the instantaneous turbine power from the gas turbine, which is determined via mathematical modeling on the basis of the operating conditions determined by measurement and/or known in the system. Here, the instantaneous turbine power can also be found by considering the respective powers of the different turbine stages, which can also be incorporated in the control separately as controlled variable.

The instantaneous power can be limited, for example, by a compressor mass flow of a compressor of the gas turbine being limited. This can be achieved by different measures, such as adjustment of a row of variable guide vanes of the compressor or by using a wet-compression method through a reduction of the quantity of water injected into the compressor.

A second aspect of the invention relates to a gas turbine plant having a gas turbine, an electric generator connected to the gas turbine, and a control unit which is connected to the gas turbine and the electric generator and which is designed to carry out the method according to the invention.

In addition, the invention relates to a computer-readable data carrier having computer-executable program code which, executed by a control unit of such a gas turbine plant, carries out the method according to the invention. The existing installations of gas turbine plants can be modified by updating their control software in such a way that they make use of the invention.

BRIEF DESCRIPTION OF THE DRAWINGS

The invention will be explained in more detail below by using depictions of exemplary embodiments. In the drawings.

DETAILED DESCRIPTION OF INVENTION

Figure 1:
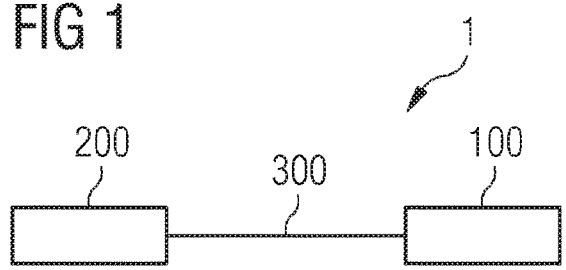
FIG. 1 shows a gas turbine plant according to the invention.

FIG. 1 shows a gas turbine plant 1 according to the invention, which comprises a gas turbine 100, which is connected via a shaft 300 to an electric generator 200 and drives the latter. The electric generator 200 converts the rotational energy provided by the gas turbine 100 into electrical energy and outputs said energy via electrical connections.

Figure 2:
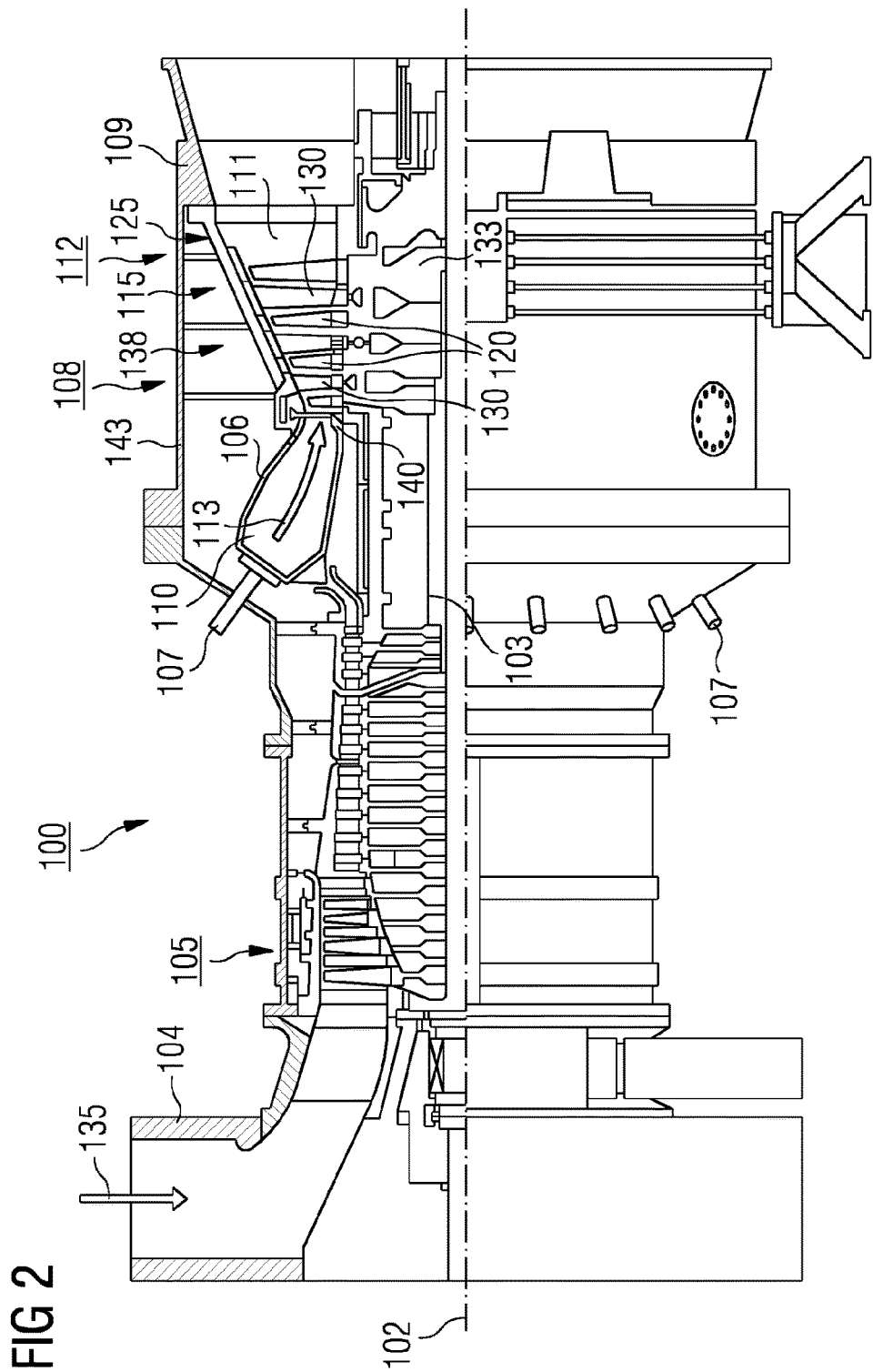
FIG. 2 shows an example of a gas turbine in a partial longitudinal section.

FIG. 2 shows an exemplary embodiment of a gas turbine, such as can be used in a gas turbine plant according to the invention, in a partial longitudinal section.

The gas turbine 100 has in the interior a rotor 103 mounted such that it can rotate about an axis of rotation 102 and having a shaft 101, which is also designated as a turbine rotor.

Along the rotor 103, an intake housing 104, a compressor 105, a combustion chamber 110, which is torus-like, for example, in particular an annular combustion chamber, having a plurality of coaxially arranged burners 107, a turbine 108 and the exhaust gas housing 109 follow one another.

From the combustion chamber 110, the hot gas expands in an annular hot-gas duct 111 of the turbine. There, for example four turbine stages 112 connected one after another form the turbine 108.

Each turbine stage 112 is formed, for example, from two blade rings. As viewed in the flow direction of a working medium 113, in the hot-gas duct 111 a row of guide vanes 115 is followed by a row 125 formed of rotor blades 120. The rotor blades 120 normally constitute those components with the highest loading, wherein the loading of the rotor blades 120 increases in the flow direction of the working medium 113 because of the increasing radii of the device. These components therefore critically determine the power limit value.

The guide vanes 130 are fixed to an inner housing 138 of a stator 143, whereas the rotor blades 120 of a row 125 are, for example, fixed to the rotor 103 by means of a turbine disk 133. An electric generator (not illustrated) is coupled to the rotor 103.

During the operation of the gas turbine 100, air 135 is sucked in through the intake housing 104 by the compressor 105 and is compressed. The compressed air provided at the turbine-side end of the compressor 105 is led to the burners 107 and there is mixed with a fuel. The mixture is then burned in the combustion chamber 110, forming the working medium 113. From said chamber, the working medium 113 flows out along the hot-gas duct 111 past the guide vanes 130 and the rotor blades 120. The working medium 113 expands on the rotor blades 120, transmitting momentum, so that the rotor blades 120 drive the rotor 103 and the latter drives the working machine coupled thereto.

The components exposed to the hot working medium 113 undergo thermal loading during the operation of the gas turbine 100.

The guide vanes 130 and rotor blades 120 of the first turbine stage 112, seen in the flow direction of the working medium 113, are most thermally loaded, apart from the heat-shield elements lining the annular combustion chamber 110.

The guide vanes 130 have a guide vane foot (not shown here) facing the inner housing 138 of the turbine 108, and a guide vane head opposite the guide vane foot. The guide vane head faces the rotor 103 and is fixed to a fixing ring 140 of the stator 143.

Figure 3:
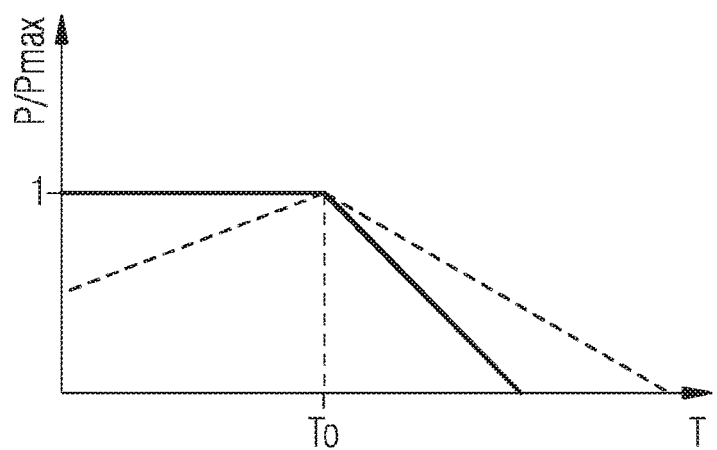
FIG. 3 shows a first graph which explains the power of a gas turbine as a function of temperature, as is known, for example, from the prior art.

FIG. 3 shows a first graph, which explains the power from a gas turbine as a function of temperature, as is known from the prior art, for example. Here, the electrical output of the gas turbine plant is plotted as a continuous line, and the turbine power of the gas turbine is plotted as a dashed line against the ambient temperature T, wherein the two aforementioned powers are normalized to their respective power limit value.

The gas turbine plant is operated in accordance with the conventional procedure in the example of FIG. 3. It can be seen that, for high temperatures, because of the reduced density of the ambient air and the mass flow of the compressor of the gas turbine, which is reduced as a result, the electrical output from the gas turbine plant remains below the set limit and decreases further with increasing ambient temperature. The turbine power from the gas turbine, which determines the actual loading of the turbine section of the gas turbine, exhibits a corresponding behavior. With falling ambient temperatures, the air taken in by the compressor becomes denser, so that the gas turbine can be provided with a greater mass flow from the compressor, which necessitates a correspondingly rising turbine power and also electrical output. If the electrical output reaches a previously determined maximum value which, in the example shown, takes place at an ambient temperature $T_0$, it is limited and possibly kept close to the maximum value, which can be done by control actions on the compressor. At the ambient temperature $T_0$, the turbine power from the gas turbine also reaches its maximum permissible value. If the ambient temperature falls further, the electrical output is kept constant but the gas turbine is able to reach this electrical output with a smaller and smaller turbine power from the gas turbine. This is explained by the fact that the rotational energy taken from the hot gas stream of the burned fuel by the turbine section is again output partially to the compressor which compresses the combustion air. Since, because of the falling temperatures and a falling compressor mass flow, less compressor work has to be expended, a correspondingly greater part of the rotational energy can be converted into electrical energy in the electric generator. However, since the electrical output of the generator is then kept constant, the gas turbine is able to provide this electrical output with a decreasing turbine power as the ambient temperatures fall. Accordingly, the loading of the gas turbine at low temperatures also falls below the maximum permissible amount.

Figure 4:
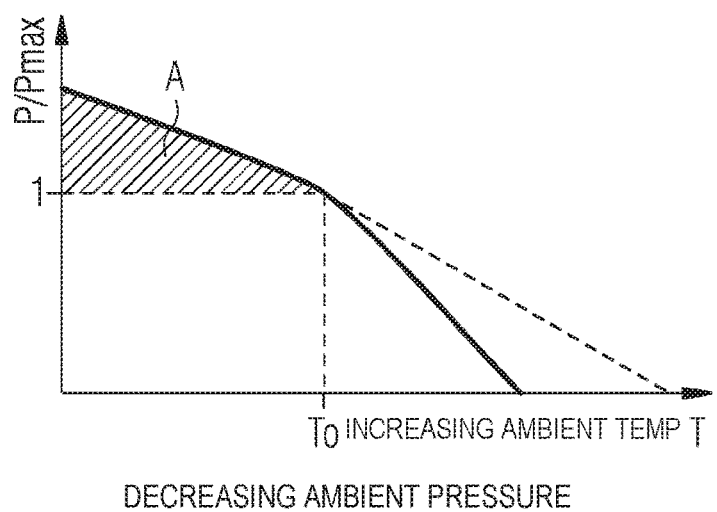
FIG. 4 shows a second graph, which explains the power of a gas turbine once more as a function of temperature.

FIG. 4 shows a further graph, which explains the power from a gas turbine as a function of temperature. Here, once more the electrical output from the gas turbine plant is plotted as a continuous line and the turbine power from the gas turbine is plotted as a dashed line against the ambient temperature T. The behavior above the ambient temperature $T_0$ corresponds to that of FIG. 3, so that repetition of the above explanations can be omitted. Below the ambient temperature $T_0$, however, the gas turbine is then controlled in such a way that the power limit value is determined as a function of the prevailing operating conditions. The aim here is to keep the turbine power as controlled variable at its maximum permissible value. However, with falling ambient temperatures with a decreasing compressor power, the desired mass flow of the compressor air can be provided, so that a correspondingly higher proportion of the turbine power can be output to the electric generator. The consequence of this is a corresponding increase in the electrical output from the gas turbine plant. The economic potential of the invention can be read off from the hatched area A in FIG. 4. While FIGS. 3 and 4 refer to the ambient temperature, corresponding statements in the sense of the present invention can be made in relation to the air pressure, although the action of a rising air pressure has to be compared with that of a decreasing ambient temperature, and that of a falling air pressure has to be compared with that of an increasing ambient temperature.

Although the invention has been illustrated and described in more detail through the preferred exemplary embodiment, the invention is not restricted by the examples disclosed. Variations therefrom can be derived by those skilled in the art without departing from the protective scope of the invention as it is defined by the following patent claims.

The invention claimed is:

1. A method for operating a gas turbine plant having a gas turbine that provides turbine power to an electric generator that produces an electrical output, the method comprising:
   providing a power limit value defined as a maximum power at which the gas turbine can be operated based on mechanical integrities of individual components of the gas turbine;
   determining an instantaneous power of the gas turbine;
   detecting at least one operating parameter of the gas turbine plant; and
   controlling the gas turbine plant based on the turbine power as a controlled variable by:
     varying the power limit value as a function of the at least one detected operating parameter, wherein the at least one detected operating parameter comprises a detected ambient pressure, and the power limit value is increased based on an increase in the detected ambient pressure;
     comparing the instantaneous power with the power limit value; and
     limiting the instantaneous power in response to a determination that the instantaneous power is equal to or greater than the power limit value,
     wherein the turbine power is maintained at the power limit value and provided to the electric generator as the power limit value is increased based on the increase in the detected ambient pressure, resulting in a corresponding increase in the electrical output.

2. The method of claim 1,
   wherein the at least one detected operating parameter of the gas turbine plant further comprises a selected operating parameter, the selected operating parameter comprising a detected ambient temperature, a detected total running time of the gas turbine or a detected total energy output from the gas turbine plant.

3. The method of claim 2,
   wherein the selected operating parameter comprises the detected ambient temperature, and wherein during the varying of the power limit value, the power limit value is increased based on a decrease in the detected ambient temperature.

4. The method of claim 2,
   wherein the selected operating parameter comprises the detected total running time of the gas turbine engine, and total wherein during the varying of the power limit value, the power limit value is reduced based on the detected total running time of the gas turbine exceeding a previously determined threshold value.

5. The method of claim 1,
   wherein the instantaneous power of the gas turbine is determined indirectly from the electric generator at its electrical outputs.

6. The method of claim 1,
   wherein the instantaneous power of the gas turbine is determined directly from a determination of the turbine power.

7. The method of claim 1,
   wherein the limiting of the instantaneous power is performed by limiting a compressor mass flow of a compressor of the gas turbine.

8. A gas turbine plant comprising:
a gas turbine that provides turbine power,
an electric generator connected to the gas turbine that produces an electrical output, and
a controller connected to the gas turbine and the electric generator, the controller configured to:
provide a power limit value defined as a maximum power at which the gas turbine can be operated based on mechanical integrities of individual components of the gas turbine;
determine an instantaneous power of the gas turbine;
detect at least one operating parameter of the gas turbine plant; and
control the gas turbine plant based on the turbine power as a controlled variable by:
 varying a power limit value as a function of the at least one detected operating parameter, wherein the at least one detected operating parameter comprises a detected ambient pressure, and the power limit value is increased based on an increase in the detected ambient pressure;
 comparing the instantaneous power with the power limit value; and
 limiting the instantaneous power in response to a determination that the instantaneous power is equal to or greater than the power limit value,
 wherein the turbine power is maintained at the power limit value and provided to the electric generator as the power limit value is increased based on the increase in the detected ambient pressure, resulting in a corresponding increase in the electrical output.

9. A non-transitory computer-readable data carrier having computer-executable program code which, when executed by a controller of the gas turbine plant, carries out the method of claim 1.

* * * * *